US006900851B2

(12) United States Patent
Morrison et al.

(10) Patent No.: US 6,900,851 B2
(45) Date of Patent: *May 31, 2005

(54) ELECTRO-OPTIC DISPLAYS AND OPTICAL SYSTEMS FOR ADDRESSING SUCH DISPLAYS

(75) Inventors: Ian D. Morrison, Acton, MA (US);
Rachael A. Forgit, Reading, MA (US);
Peter J. Valianatos, Boston, MA (US);
Craig A. Herb, Medford, MA (US);
Guy M. Danner, Somerville, MA (US)

(73) Assignee: E Ink Corporation, Cambridge, MA (US)

( * ) Notice: Subject to any disclaimer, the term of this patent is extended or adjusted under 35 U.S.C. 154(b) by 587 days.

This patent is subject to a terminal disclaimer.

(21) Appl. No.: 10/071,608

(22) Filed: Feb. 8, 2002

(65) Prior Publication Data

US 2003/0151702 A1 Aug. 14, 2003

(51) Int. Cl.⁷ .............................................. G02F 1/135
(52) U.S. Cl. ....................................................... 349/25
(58) Field of Search .............................. 349/24, 25, 61, 349/139

(56) References Cited

U.S. PATENT DOCUMENTS

| 3,036,388 A | 4/1962 | Tate ........................... 434/489 |
| 3,384,488 A | 5/1968 | Tulagin et al. ................ 430/32 |
| 3,612,758 A | 10/1971 | Evans et al. ................ 348/803 |
| 3,670,323 A | 6/1972 | Sobel et al. ................ 345/107 |
| 3,767,392 A | 10/1973 | Ota ............................. 430/35 |
| 3,792,308 A | 2/1974 | Ota ............................. 315/150 |
| 3,806,893 A | 4/1974 | Ohnishi et al. ............. 365/153 |
| 3,850,627 A | 11/1974 | Wells et al. ................ 430/34 |

(Continued)

FOREIGN PATENT DOCUMENTS

| DE | 44 31 441 C1 | 2/1996 |
| DE | 195 00 694 A1 | 8/1996 |
| EP | 0 186 710 A1 | 7/1986 |

(Continued)

OTHER PUBLICATIONS

Blazo, "10.1/9:00 A.M.: High Resolution Electrophoretic Display with Photoconductor Addressing." *SID 82 Digest*, 1982, (pp. 92–93).

Bohnke et al., "Polymer–Based Solid Electrochronic Cell for Matrix–Addressable Display Devices," *J. Electrochem Soc.*, Dec. 1991, vol. 138, No. 12, (pp. 3612–3617).

Chiang et al., "11.5/4:10 P.M.: A High Speed Electrophoretic Matrix Display," *SID 80 Digest*, 1980, (pp. 114–115).

(Continued)

*Primary Examiner*—Tarifur R Chowdhury
(74) *Attorney, Agent, or Firm*—Testa, Hurwitz & Thibeault, LLP

(57) ABSTRACT

The invention features a photoconductively addressed display and a method of photoconductive addressing in a display. The method includes providing an electro-optic imaging layer that extends in an X direction and a Y direction and comprises an array of image elements. A column electrode layer is provided adjacent to one side of the electro-optic imaging layer. The column electrode layer includes a plurality of column electrodes that each extend in the Y direction and are spaced from one another in the X direction. A photoconductive layer disposed between the electro-optic imaging layer and the column electrode layer is provided. An elongate portion of the photoconductive layer is illuminated in the X direction while scanning the illumination in the Y direction to translate a location of the illuminated elongate portion. At least one image element of the array of image elements is addressed by applying an intermittent voltage to one of the plurality of column electrodes that is adjacent to the at least one image element while the illuminated elongate portion of the photoconductive layer is adjacent to the at least one image element.

23 Claims, 10 Drawing Sheets

U.S. PATENT DOCUMENTS

| | | | |
|---|---|---|---|
| 3,972,040 A | 7/1976 | Hilsum et al. | 345/76 |
| 4,041,481 A | 8/1977 | Sato | 345/107 |
| 4,045,327 A | 8/1977 | Noma et al. | 359/237 |
| 4,068,927 A | 1/1978 | White | 359/296 |
| 4,071,430 A | 1/1978 | Liebert | 359/241 |
| 4,088,395 A | 5/1978 | Giglia | 359/269 |
| 4,123,346 A | 10/1978 | Ploix | 359/271 |
| 4,149,149 A | 4/1979 | Miki et al. | 345/38 |
| 4,203,106 A | 5/1980 | Dalisa et al. | 345/107 |
| 4,218,302 A | 8/1980 | Dalisa et al. | 359/296 |
| 4,261,653 A | 4/1981 | Goodrich | 359/296 |
| 4,305,807 A | 12/1981 | Somlyody | 349/166 |
| 4,311,361 A | 1/1982 | Somlyody | 359/296 |
| 4,324,456 A | 4/1982 | Dalissa | 359/296 |
| 4,390,403 A | 6/1983 | Batchelder | 204/643 |
| 4,418,346 A | 11/1983 | Batchelder | 345/107 |
| 4,430,648 A | 2/1984 | Togashi et al. | 345/205 |
| 4,439,507 A | 3/1984 | Pan et al. | 430/58 |
| 4,450,440 A | 5/1984 | White | 345/35 |
| 4,502,934 A | 3/1985 | Gazard et al. | 204/242 |
| 4,522,472 A | 6/1985 | Liebert et al. | 359/296 |
| 4,543,306 A | 9/1985 | Dubois et al. | 359/296 |
| 4,598,960 A | 7/1986 | DiSanto et al. | 429/337 |
| 4,643,528 A | 2/1987 | Bell, Jr. | 439/66 |
| 4,648,956 A | 3/1987 | Marshall et al. | 349/166 |
| 4,655,897 A | 4/1987 | DiSanto et al. | 359/296 |
| 4,686,524 A | 8/1987 | White | 359/296 |
| 4,732,830 A | 3/1988 | DiSanto et al. | 345/107 |
| 4,741,604 A | 5/1988 | Kornfeld | 430/20 |
| 4,742,345 A | 5/1988 | DiSanto et al. | 359/296 |
| 4,746,917 A | 5/1988 | DiSanto et al. | 345/107 |
| 4,812,647 A * | 3/1989 | Broussoux et al. | 250/578.1 |
| 4,833,464 A | 5/1989 | DiSanto et al. | 345/107 |
| 4,846,931 A | 7/1989 | Gmitter et al. | 345/107 |
| 4,850,919 A | 7/1989 | DiSanto et al. | 438/26 |
| 4,883,561 A | 11/1989 | Gmitter et al. | 445/24 |
| 4,892,607 A | 1/1990 | DiSanto et al. | 438/27 |
| 4,931,019 A | 6/1990 | Park | 156/275 |
| 4,947,159 A | 8/1990 | DiSanto et al. | 434/409 |
| 5,009,490 A | 4/1991 | Kouno et al. | 345/107 |
| 5,028,841 A | 7/1991 | DiSanto et al. | 349/25 |
| 5,041,824 A | 8/1991 | DiSanto et al. | 313/505 |
| 5,053,763 A | 10/1991 | DiSanto et al. | 345/107 |
| 5,066,105 A | 11/1991 | Yoshimoto et al. | 349/53 |
| 5,066,946 A | 11/1991 | DiSanto et al. | 345/107 |
| 5,070,326 A | 12/1991 | Yoshimoto et al. | 349/53 |
| 5,077,157 A | 12/1991 | DiSanto et al. | 430/20 |
| 5,105,185 A | 4/1992 | Nakanowatari et al. | 345/94 |
| 5,128,226 A | 7/1992 | Hung | 430/59 |
| 5,128,785 A | 7/1992 | Yoshimoto et al. | 349/53 |
| 5,161,007 A | 11/1992 | Takanashi et al. | 348/207 |
| 5,174,882 A | 12/1992 | DiSanto et al. | 359/238 |
| 5,177,476 A | 1/1993 | DiSanto et al. | 345/107 |
| 5,187,609 A | 2/1993 | DiSanto et al. | 359/296 |
| 5,194,852 A | 3/1993 | More et al. | 345/182 |
| 5,216,416 A | 6/1993 | DiSanto et al. | 345/107 |
| 5,220,316 A | 6/1993 | Kazan | 345/96 |
| 5,223,115 A | 6/1993 | DiSanto et al. | 359/238 |
| 5,223,823 A | 6/1993 | Disanto et al. | 345/107 |
| 5,238,861 A | 8/1993 | Morin et al. | 438/155 |
| 5,247,290 A | 9/1993 | DiSanto et al. | 345/107 |
| 5,250,932 A | 10/1993 | Yoshimoto et al. | 349/53 |
| 5,250,938 A | 10/1993 | DiSanto et al. | 345/107 |
| 5,254,981 A | 10/1993 | Disanto et al. | 345/107 |
| 5,266,937 A | 11/1993 | DiSanto et al. | 345/107 |
| 5,270,843 A | 12/1993 | Wang | 349/90 |
| 5,276,438 A | 1/1994 | DiSanto et al. | 345/107 |
| 5,279,694 A | 1/1994 | DiSanto et al. | 156/275 |
| 5,293,528 A | 3/1994 | DiSanto et al. | 345/107 |
| 5,296,974 A | 3/1994 | Tada et al. | 359/885 |
| 5,302,235 A | 4/1994 | DiSanto et al. | 216/5 |
| 5,303,073 A | 4/1994 | Shirota et al. | 349/74 |
| 5,304,439 A | 4/1994 | Disanto et al. | 430/20 |
| 5,315,312 A | 5/1994 | DiSanto et al. | 345/107 |
| 5,345,251 A | 9/1994 | DiSanto et al. | 345/107 |
| 5,359,346 A | 10/1994 | DiSanto et al. | 345/107 |
| 5,362,671 A | 11/1994 | Zavracky et al. | 438/29 |
| 5,383,008 A | 1/1995 | Sheridon | 399/156 |
| 5,389,945 A | 2/1995 | Sheridon | 345/85 |
| 5,402,145 A | 3/1995 | DiSanto et al. | 345/107 |
| 5,403,772 A | 4/1995 | Zhang et al. | 438/166 |
| 5,412,398 A | 5/1995 | DiSanto et al. | 345/107 |
| 5,430,462 A * | 7/1995 | Katagiri et al. | 345/104 |
| 5,460,688 A | 10/1995 | DiSanto et al. | 216/5 |
| 5,463,492 A | 10/1995 | Check, III | 359/296 |
| 5,467,107 A | 11/1995 | DiSanto et al. | 345/107 |
| 5,499,038 A | 3/1996 | DiSanto et al. | 345/107 |
| 5,508,720 A | 4/1996 | DiSanto et al. | 345/169 |
| 5,545,291 A | 8/1996 | Smith et al. | 438/107 |
| 5,561,443 A | 10/1996 | DiSanto et al. | 345/107 |
| 5,565,885 A | 10/1996 | Tamanoi | 345/100 |
| 5,569,610 A | 10/1996 | Zhang et al. | 438/166 |
| 5,573,711 A | 11/1996 | Hou et al. | 362/103 |
| 5,575,554 A | 11/1996 | Guritz | 342/152 |
| 5,583,675 A | 12/1996 | Yamada et al. | 349/84 |
| 5,602,572 A | 2/1997 | Rylander | 347/131 |
| 5,609,978 A | 3/1997 | Giorgianni et al. | 430/30 |
| 5,614,340 A | 3/1997 | Bugner et al. | 430/41 |
| 5,623,585 A | 4/1997 | Matias et al. | 345/502 |
| 5,625,199 A | 4/1997 | Baumbach et al. | 257/40 |
| 5,627,561 A | 5/1997 | Laspina et al. | 345/107 |
| 5,638,103 A | 6/1997 | Obata et al. | 347/164 |
| 5,648,801 A | 7/1997 | Beardsley et al. | 347/15 |
| 5,650,199 A | 7/1997 | Chang et al. | 427/333 |
| 5,650,247 A | 7/1997 | Taniguchi et al. | 430/1 |
| 5,650,872 A | 7/1997 | Saxe et al. | 359/296 |
| 5,675,719 A | 10/1997 | Matais et al. | 358/1.1 |
| 5,684,501 A | 11/1997 | Knapp et al. | 345/94 |
| 5,686,383 A | 11/1997 | Long et al. | 503/227 |
| 5,688,584 A | 11/1997 | Casson et al. | 428/209 |
| 5,689,282 A | 11/1997 | Wolfs et al. | 345/100 |
| 5,699,102 A | 12/1997 | Ng et al. | 347/224 |
| 5,707,738 A | 1/1998 | Hou | 428/402 |
| 5,714,051 A | 2/1998 | Van Leth et al. | 205/122 |
| 5,715,511 A | 2/1998 | Aslam et al. | 399/320 |
| 5,715,514 A | 2/1998 | Williams et al. | 399/395 |
| 5,717,514 A | 2/1998 | Sheridon | 359/296 |
| 5,718,996 A | 2/1998 | Iijima et al. | 430/56 |
| 5,721,042 A | 2/1998 | Iijima et al. | 428/195 |
| 5,725,935 A | 3/1998 | Rajan | 428/195 |
| 5,729,663 A | 3/1998 | Lin et al. | 358/3 |
| 5,731,116 A | 3/1998 | Matsuo et al. | 430/56 |
| 5,737,115 A | 4/1998 | Mackinlay et al. | 359/296 |
| 5,738,977 A | 4/1998 | Van Der Sluis-Van Der Voort et al. | 430/313 |
| 5,739,801 A | 4/1998 | Sheridon | 345/84 |
| 5,740,495 A | 4/1998 | Maher et al. | 399/71 |
| 5,744,283 A | 4/1998 | Spierings et al. | 430/313 |
| 5,750,238 A | 5/1998 | Iijima et al. | 428/195 |
| 5,783,856 A | 7/1998 | Smith et al. | 257/618 |
| 5,786,875 A | 7/1998 | Brader et al. | 349/20 |
| 5,821,137 A | 10/1998 | Wakai et al. | 438/163 |
| 5,824,186 A | 10/1998 | Smith et al. | 438/597 |
| 5,892,244 A | 4/1999 | Tanaka et al. | 257/40 |
| 5,892,504 A | 4/1999 | Knapp | 345/204 |
| 5,904,545 A | 5/1999 | Smith et al. | 438/455 |
| 5,930,026 A | 7/1999 | Jacobson et al. | 359/296 |
| 5,936,259 A | 8/1999 | Katz et al. | 257/40 |
| 5,961,804 A | 10/1999 | Jacobson et al. | 204/606 |
| 5,969,376 A | 10/1999 | Bao | 257/40 |
| 6,005,791 A | 12/1999 | Gudesen et al. | 365/114 |

| | | | |
|---|---|---|---|
| 6,005,817 A | 12/1999 | Gudesen et al. | 365/215 |
| 6,045,955 A | 4/2000 | Vincent | 430/45 |
| 6,055,180 A | 4/2000 | Gudesen et al. | 365/175 |
| 6,310,665 B1 * | 10/2001 | Kido | 349/32 |

FOREIGN PATENT DOCUMENTS

| | | |
|---|---|---|
| EP | 0 325 013 B1 | 7/1989 |
| EP | 0 325 013 A1 | 7/1989 |
| EP | 0 344 367 A1 | 12/1989 |
| EP | 0 344 367 B1 | 12/1989 |
| EP | 0 361 420 A2 | 4/1990 |
| EP | 0 362 928 A1 | 4/1990 |
| EP | 0 363 030 B1 | 4/1990 |
| EP | 0 363 030 A2 | 4/1990 |
| EP | 0 396 247 B1 | 11/1990 |
| EP | 0 396 247 A2 | 11/1990 |
| EP | 0 404 545 A2 | 12/1990 |
| EP | 0 443 571 A2 | 8/1991 |
| EP | 0 448 853 A1 | 10/1991 |
| EP | 9 448 853 B1 | 10/1991 |
| EP | 0 460 747 A2 | 12/1991 |
| EP | 0 525 852 B1 | 2/1993 |
| EP | 0 525 852 A1 | 2/1993 |
| EP | 0 570 995 A1 | 11/1993 |
| EP | 0 570 995 B1 | 11/1993 |
| EP | 0 575 475 B1 | 12/1993 |
| EP | 0 586 373 B1 | 3/1994 |
| EP | 0 586 545 B1 | 3/1994 |
| EP | 0 595 812 B1 | 5/1994 |
| EP | 0 601 072 B1 | 6/1994 |
| EP | 0 601 075 B1 | 6/1994 |
| EP | 0 604 423 B1 | 7/1994 |
| EP | 0 618 715 A1 | 10/1994 |
| EP | 0 684 579 A2 | 11/1995 |
| EP | 0 685 101 B1 | 12/1995 |
| EP | 0 709 713 A2 | 5/1996 |
| EP | 0 924 551 A1 | 6/1999 |
| EP | 0 962 808 A2 | 12/1999 |
| EP | 1 024 540 A2 | 8/2000 |
| FR | 2 693 005 | 12/1993 |
| GB | 1 314 906 | 4/1973 |
| GB | 2 149 548 A | 6/1985 |
| GB | 2 306 229 A | 4/1997 |
| GB | 2 324 273 A | 10/1998 |
| JP | 54111368 | 8/1979 |
| JP | 55096922 | 7/1980 |
| JP | 62058222 | 3/1987 |
| JP | 62231930 | 10/1987 |
| JP | 01086116 | 3/1989 |
| JP | 6486116 | 3/1989 |
| JP | 03053114 A | 3/1991 |
| JP | 3053224 | 3/1991 |
| JP | 3091722 | 4/1991 |
| JP | 03091722 A | 4/1991 |
| JP | 3096925 | 4/1991 |
| JP | 03096925 A | 4/1991 |
| JP | 5-61421 | 3/1993 |
| JP | 6089081 | 3/1994 |
| JP | 6-202168 | 7/1994 |
| JP | 07036020 | 2/1995 |
| JP | 9-6277 | 1/1997 |
| JP | 9031453 A | 2/1997 |
| JP | 9-185087 | 7/1997 |
| JP | 09230391 | 9/1997 |
| JP | 10-48673 | 2/1998 |
| JP | 10072571 A | 3/1998 |
| JP | 10-149118 A | 6/1998 |
| JP | 10-161161 | 6/1998 |
| JP | 11202804 | 7/1999 |
| JP | 11212499 | 8/1999 |
| JP | 11219135 | 8/1999 |
| JP | 11264812 | 9/1999 |
| WO | WO 92/12453 | 7/1992 |
| WO | WO 92/17873 | 10/1992 |
| WO | WO 92/20060 | 11/1992 |
| WO | WO 92/21733 | 12/1992 |
| WO | WO 93/02443 | 2/1993 |
| WO | WO 93/04458 | 3/1993 |
| WO | WO 93/04459 | 3/1993 |
| WO | WO 93/05425 | 3/1993 |
| WO | WO 93/07608 | 4/1993 |
| WO | WO 93/17414 | 9/1993 |
| WO | WO 93/18428 | 9/1993 |
| WO | WO 94/19789 | 9/1994 |
| WO | WO 95/05622 | 2/1995 |
| WO | WO 95/06307 | 3/1995 |
| WO | WO 95/07527 | 3/1995 |
| WO | WO 95/10107 | 4/1995 |
| WO | WO 95/22085 | 8/1995 |
| WO | WO 96/41372 | 12/1996 |
| WO | WO 97/01165 | 1/1997 |
| WO | WO 97/01166 | 1/1997 |
| WO | WO 97/01171 | 1/1997 |
| WO | WO 97/04398 | 2/1997 |
| WO | WO 97/24907 | 7/1997 |
| WO | WO 97/35298 | 9/1997 |
| WO | WO 97/48009 | 12/1997 |
| WO | WO 97/49125 | 12/1997 |
| WO | WO 98/03896 | 1/1998 |
| WO | WO 98/19208 | 5/1998 |
| WO | WO 98/41898 | 9/1998 |
| WO | WO 98/55897 | 12/1998 |
| WO | WO 98/58383 | 12/1998 |
| WO | WO 99/10768 | 3/1999 |
| WO | WO 99/12170 | 3/1999 |
| WO | WO 99/20682 | 4/1999 |
| WO | WO 99/26419 | 5/1999 |
| WO | WO 99/40631 | 8/1999 |
| WO | WO 99/41732 | 8/1999 |
| WO | WO 99/41787 | 8/1999 |
| WO | WO 99/41788 | 8/1999 |
| WO | WO 99/44229 | 9/1999 |
| WO | WO 99/45416 | 9/1999 |
| WO | WO 99/45582 | 9/1999 |
| WO | WO 99/47970 | 9/1999 |
| WO | WO 99/53371 | 10/1999 |
| WO | WO 99/56171 | 11/1999 |
| WO | WO 99/63527 | 12/1999 |
| WO | WO 99/65011 | 12/1999 |
| WO | WO 99/65012 | 12/1999 |

OTHER PUBLICATIONS

Dalisa, "Electrophoretic Display Technology," *Transactions on Electron Devices*, Jul. 1977, vol. 24, No. 7, (pp. 827–834).

Hosaka et al., "Electromagnetic Microrelays: Concepts and Fundamental Characteristics," *Sensors and Actuators*, 1994, vol. 40, (pp. 41–47).

Kornfield, "9.5: A Defect–Tolerant Active–Matrix Electrophoretic Display," *SID 84 Digest*, 1984, (pp. 142–144).

Moesner et al., "Devices for Particle Handling by an AC Electric Field," *Proceedings of the IEEE*, 1995, (pp. 66–71).

Murau, "9.4: Characteristics of an X–Y Addressed Electrophoretic Image Display (EPID)," *SID 84 Digest*, 1984, (p. 141).

Vaz et al., "Dual Frequency Addressing of Polymer–Dispersed Liquid–Crystal Films," *J. Appl. Phys.*, Jun. 1989, vol. 65, No. 12, (pp. 5043–5050).

Ota et al., "Developments in Electrophoretic Displays," *Proceedings of the SID*, 1977, vol. 18, Nos. 3 & 4, (pp. 243–254).

Ota et al., "Electrophoretic Display Devices," *Laser 75 Optoelectronics Conference Proceedings*, (pp. 145–148).

Ota et al., "Electrophoretic Image Display," *Proceedings of the IEEE*, Jul. 1973, (pp. 832–836).

Pankove, "Color Reflection Types Display Panel," *RCA Technical Notes*, Mar. 1962, No. 535, (2 sheets).

Saitoh et al., "A Newly Developed Electrical Twisting Ball Display," *Proceedings of the SID*, 1982 vol. 23, No. 4, (pp. 249–253).

Sheridon et al., "10.2/9:25 A.M.: A Photoconductor–Addressed Electrophoretic Cell for Office Data Display," *SID 82 Digest*, 1982, (pp. 94–95).

Shiffman et al., "An Electrophoretic Display with Internal NMOS Address Logic and Display Drivers," *Proceedings of the SID*, 1984, vol. 25, No. 2, (pp. 105–115).

Shiwa et al., "5.6: Electrophoretic Display Method Using Ionographic Technology," *SID 88 Digest*, 1988, (pp. 61–62).

Singer et al., "An X–Y Addressable Electrophoretic Display," *Proceeding of the SID*, 1977, vol. 18, Nos. 3 & 4, (pp. 255–266).

Vance, "Optical Characteristics of Electrophoretic Displays," *Proceeding of the SID*, 1977, vol. 18, Nos. 3 & 4, (pp. 267–274).

Yamaguchi et al., "Equivalent Circuit of Ion Projection–Driven Electrophoretic Display," *IEICE Transactions*, 1991, vol. 74, No. 12, (4152–4156).

Comiskey et al., "An Electrophoretic Ink for All–Printed Reflective Electronic Displays," *Nature*, Jul. 1998, vol. 394, (pp. 253–255).

Hopper et al. (1979), "An Electrophoretic Display, Its Properties, Model and Addressing," *Transaction on Electron Devices*, 26(8):1148–1152.

White, "An Electrophoretic Bar Graph Display," *Proceedings of the SID*, 1981, 22(3):173–180.

Antia (1999), "Switchable Reflections Make Electronic Ink", *Science*, 285:658.

Quon, S. (1977), "Multilevel Voltage Select (MLVS): A Novel Technique to X–Y Address an Electrophoretic Image Display," *Correspondence* 1120–1123.

Chiang, "A Stylus Writable Electrophoretic Display Device," SID 79 Digest, pp. 44–45.

Nakamura et al., Development of Electrophoretic Display Using Microencapsulated Suspension, 1998 ISD International Symposium Digest of Technical Papers—vol. 29, Proceedings of SID '98 International Symposium, Anaheim, CA, USA, May 1998, pp. 1014–1017.

Ridley et al., "All–Inorganic Field Effect Transistors Fabricated by Printing," Science, Oct. 22, 1999, vol. 286, pp. 746–748.

Dabbousi et al., "Electroluminescence from CdSe quantum–dot/polymer composites," Appl. Phys. Lett., Mar. 1995, vol. 66 (11), 13, pp. 1316–1318.

Huang et al., "Photoluminescence and Electroluminescence of ZnS:Cu nanocrystals in polymeric networks," Appl. Phys. Lett., May 5, 1997, vol. 70, No. 18, pp. 2335–2337.

Drzaic et al. "A Printed and Rollable Bistable Electronic Display," 1998 SID International Symposium, Digest of Technical Papers, 1998, vol. 29, pp. 1131–1134.

* cited by examiner

ELECTRO-OPTIC DISPLAYS AND OPTICAL SYSTEMS FOR ADDRESSING SUCH DISPLAYS

FIELD OF THE INVENTION

This invention relates generally to electro-optic displays. More particularly, the invention relates to systems for and methods of addressing electro-optic displays with a combined application of light and voltage.

BACKGROUND OF THE INVENTION

A number of interesting electro-optic display media have potential application in displays possessing good optical appearance, large area potential, flexible substrates, low cost, and ease of manufacture. Such display media include microencapsulated electrophoretic displays, rotating bichromal ball displays, suspended particle displays, and composites of liquid crystals with polymers, including polymer dispersed liquid crystals, polymer stabilized liquid crystals, and liquid crystal gels.

Such display media also include electrochromic media. An example electrochromic medium takes the form of a nanochromic film including an electrode formed at least in part from a semiconducting metal oxide and dye molecules capable of reversible color change attached to the electrode. See, for example, B. O'Regan, et al., Nature, 353, page 737 (1991). Nanochromic films of this type are also described, for example, in International Applications Publication Nos. WO 98/35267 and WO 01/27690.

Practical and cost effective image element addressing techniques, however, remain elusive for such displays. For example, direct drive addressing provides control of each element, or pixel, through an external drive circuit. This scheme is both expensive and impractical for displays containing a large number of pixels or closely spaced pixels.

Active matrix addressing requires use of electrically non-linear elements on the display substrate. Non-linear elements include, e.g., transistors, diodes, and varistors. While this type of addressing is well-known and widely practiced, it is expensive to produce and difficult to achieve on plastic substrates.

A third means of addressing uses multiplexing, in which the conductive portions of the substrate are patterned so that rows of pixels on the substrate are electrically connected to each other, and columns of pixels on the substrate are also electrically connected to each other. Typically, voltages are sequentially placed on the row electrodes, with the pixel data for each row corresponding to voltages applied on the column electrodes.

Multiplexing, and other passive addressing schemes, are used in combination with a variety of display media. Use of passive addressing is limited, however, to displays in which the optical response as a function of applied voltage is non-linear and/or in which there is a significant voltage threshold to turn on the pixels. Display media which do not show a pronounced voltage threshold show poor contrast when driven with multiplex addressing schemes.

More specifically, standard passive addressing schemes work poorly with many particle based, electrophoretic displays, and some other types of electro-optic displays. Addressing such electro-optic media-based image elements by combined application of voltages on neighboring row and column electrodes generally requires that the medium exhibit a threshold voltage response effect. Alternatively, the medium may exhibit a steep, nonlinear response to the applied voltages. Barring this, application of a voltage on one row of electrodes (or column) typically causes an image response along the entire row, defeating the ability to address, and cause an image response in, a single element or pixel.

Some image forming techniques employ a photoconductive layer rather than matrix addressing techniques. Typically, a voltage is applied across two plate electrodes that reside on either side of an electro-optic display medium. Rather than using row and column electrodes, the plate electrodes cover the entire display area, and a photoconductive layer lies adjacent to the display medium between the plate electrodes. Illumination of the photoconductive layer with a light image causes imagewise changes in conductivity of the photoconductive layer, corresponding to the imagewise distribution of light striking the photoconductive layer. This in turn causes imagewise increases in the voltage drop appearing across the display medium.

Hence, the display medium produces a visible image that corresponds substantially to the imagewise variations of the illuminating electromagnetic radiation. One limitation of such an approach is the need to create a light image to produce a corresponding image by the display. Further, the size and orientation of the image displayed depends on the size and orientation of the image contained within the illuminating radiation.

SUMMARY OF THE INVENTION

The invention generally features the combined use of voltage and light for matrix addressing of image elements in a display. In particular, the invention solves problems of passive addressing displays that utilize an array of electrodes that are electrically connected along rows and columns. The invention enables passive pixel addressing through use of just one set of electrodes. The role of a second set of electrodes can be replaced by illumination from a light source. The invention also overcomes the poor image quality that is characteristic of passive addressing with two sets of electrodes, i.e., electrically connected row and column electrodes.

The benefits of the invention can be realized in a display that has a photoconductive layer adjacent to an electro-optic display medium. The photoconductive layer is relatively non-conducting when not illuminated and conducting when illuminated. When an image pixel is addressed with a voltage, a corresponding voltage drop appears across portions of both the display medium and photoconductive layer that are adjacent to an electrode that carries the addressing voltage. A portion of the voltage drop appears across the photoconductive layer while the remainder appears across the electro-optic display medium.

When not illuminated, the photoconductive layer can support a substantial portion of the voltage drop. The remainder of the voltage drop can be insufficient to induce a change in the optical state of the electro-optic display medium. In contrast, the voltage drop across the photoconductive layer decreases significantly when the photoconductive layer is illuminated. Upon illumination of the photoconductive layer, charge carriers in the photoconductive layer rearrange themselves to neutralize at least a portion of the electric field within the photoconductive layer. This leads to a greater voltage drop across the electro-optic display medium, causing a change in its optical state.

Thus, when an addressing voltage is applied to the pixel while the adjacent photoconductive layer is illuminated, charge carriers in the adjacent photoconductive layer can rearrange themselves to help neutralize the electric field within the adjacent photoconductive layer. Hence, a greater portion of the voltage drop is now supported by the adjacent electro-optic display medium. The electro-optic display medium can then respond to the addressing voltage by exhibiting a change in its optical state. For example, migration of electrophoretic particles within an electrophoretic display medium can change the optical state of the pixel.

Accordingly, in a first aspect, the invention features a photoconductively addressed display. The display includes an electro-optic imaging layer that extends in an X direction and a Y direction. This imaging layer includes an array of image elements. A column electrode layer is located adjacent to one side of the electro-optic imaging layer. The column electrode layer includes a plurality of column electrodes that each extend in the Y direction and are spaced from one another in the X direction.

The display also includes a photoconductive layer disposed between the electro-optic imaging layer and the column electrode layer. An addressing voltage applied to a column electrode causes a corresponding voltage drop across an adjacent portion of the photoconductive layer and an adjacent portion of the electro-optic imaging layer.

The display further includes a light source that emits light to illuminate an elongate portion of the photoconductive layer in the X direction while scanning the emitted light in the Y direction. By scanning the emitted light, the location of the illuminated elongate portion is translated. The particular portion of the photoconductive layer that is illuminated varies with the location of the illumination at any given moment. The illuminated portion of the photoconductive layer can exhibit an increase in conductivity.

The configuration of the illuminated elongate portion varies in various embodiments. The elongate portion may have the shape of a long, narrow band, for example, the approximate dimensions of a single column electrode. In another embodiment, the illuminated elongate portion is discontinuous. For example, the illuminated portion may be segmented. The illuminated portion may be translated in a continuous sweep in the Y direction. Alternatively, the illuminated portion may move stepwise to various locations in the Y direction.

The illuminated portion may be continuously or intermittently present. The light source may emit light intermittently. Intermittent illumination may be used to assist addressing of image elements. For example, an element may be de-selected during application of a voltage by the absence of illumination.

The display further includes a voltage source that addresses at least one image element of the array of image elements. The voltage source applies an intermittent voltage to the column electrode that is adjacent to the at least one image element while the illuminated elongate portion of the photoconductive layer is adjacent to the image element. Hence, a particular image element may be addressed by temporal coincidence of application of a voltage to a column electrode adjacent to the image element and illumination of a portion of the photoconductive layer that is also adjacent to the image element.

The photoconductive layer may be patterned. In one embodiment, patterning of the photoconductive layer defines the location and dimensions of the array of image elements. For example, the photoconductive layer can include a two-dimensional array of photoconductive elements. Each photoconductive element defines the shape and location of an adjacent image element, which includes a portion of the display medium.

The column electrodes can exist in a variety of forms. Each column electrode can include a plurality of pixel electrodes and an interconnect line in electrical communication with each one of the plurality of pixel electrodes. Each pixel electrode can include a contact pad that defines a size, shape and position of an adjacent corresponding image element of the array of image elements. Each column electrode can define an X width of an adjacent image element of the array of image elements, and a Y width of the elongate portion of the photoconductive layer can define a Y width of the adjacent image element. The X direction and the Y direction can be orthogonal.

The light source has various embodiments. Light can be generated and scanned across the photoconductive layer. The emitted light can be scanned in both negative and positive Y directions. The illumination can be intermittent. The light source can include a mirror that scans the emitted light. The light source can move in the Y direction to scan the emitted light. The light source can include a cathode-ray tube.

The light source can emit light that is spatially discontinuous. For example, the light source can include a linear or two-dimensional array of light emitters. The array of light emitters can be fixed in position relative to the photoconductive layer. An array of light emitting diodes can be disposed adjacent to the photoconductive layer. The diodes can be selectively addressed to generate illumination to illuminate the elongate portion of the photoconductive layer.

The light source can include at least one optical fiber to conduct light from the light source to the photoconductive layer. An optical fiber bundle can be translated adjacent to the photoconductive layer to translate the location of the elongated portion. Alternatively, the optical fiber bundle can provide for delivery of illumination to any location on the photoconductive layer without need for moving parts. The light source can include a lens.

The display can further include an optical barrier layer disposed between the electro-optic imaging layer and the photoconductive layer. The optical barrier layer can shield the photoconductive layer from ambient light. The display can further include an electrical barrier layer disposed between the photoconductive layer and the column electrode layer.

The photoconductive layer can include a material selected from the group consisting of trigonal selenium, metal-free phthalocyanine, copper phthalocyanine, vanadyl phthalocyanine, hydroxy gallium phthalocyanine, titanyl phthalocyanine, quinacridones, 2,4-diamino-triazines, squaraines, perylenes, bis- and tris-azo pigments, and polynuclear aromatic quinines.

In a second aspect, the invention features a method of photoconductive addressing in a display. The method includes providing an electro-optic imaging layer that extends in an X direction and a Y direction and comprises an array of image elements. A column electrode layer is provided adjacent to one side of the electro-optic imaging layer. The column electrode layer includes a plurality of column electrodes that each extend in the Y direction and are spaced from one another in the X direction.

A photoconductive layer disposed between the electro-optic imaging layer and the column electrode layer is provided. An elongate portion of the photoconductive layer is illuminated in the X direction while scanning the illumination in the Y direction to translate a location of the illuminated elongate portion. At least one image element of the array of image elements is addressed by applying an intermittent voltage to one of the plurality of column electrodes that is adjacent to the at least one image element while the illuminated elongate portion of the photoconductive layer is adjacent to the at least one image element.

BRIEF DESCRIPTION OF THE DRAWINGS

The invention is pointed out with particularity in the appended claims. The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, emphasis instead generally being placed upon illustrating the principles of the invention.

DETAILED DESCRIPTION

In general terms, the invention provides an apparatus and method for passive addressing of pixels in a display device. A "pixel" is herein understood to mean an individual element in an array of image elements. In particular, the invention overcomes difficulties inherent in addressing techniques that utilize orthogonally arranged rows and columns of electrodes in active or passive addressing. The invention permits use of display media previously unsuited for passively addressed displays.

Various embodiments of the invention, some of which are described in more detail in following sections, make use of voltage and light for matrix addressing of image elements in a display. Some embodiments require only one set of electrodes, e.g. a set of column electrodes. Display medium included in a pixel may have its optical state modified by coincident application of a voltage to an electrode that is adjacent to the display medium while illumination is applied to photoconductive material that is adjacent to the display medium.

Display Structure

Figure 1:
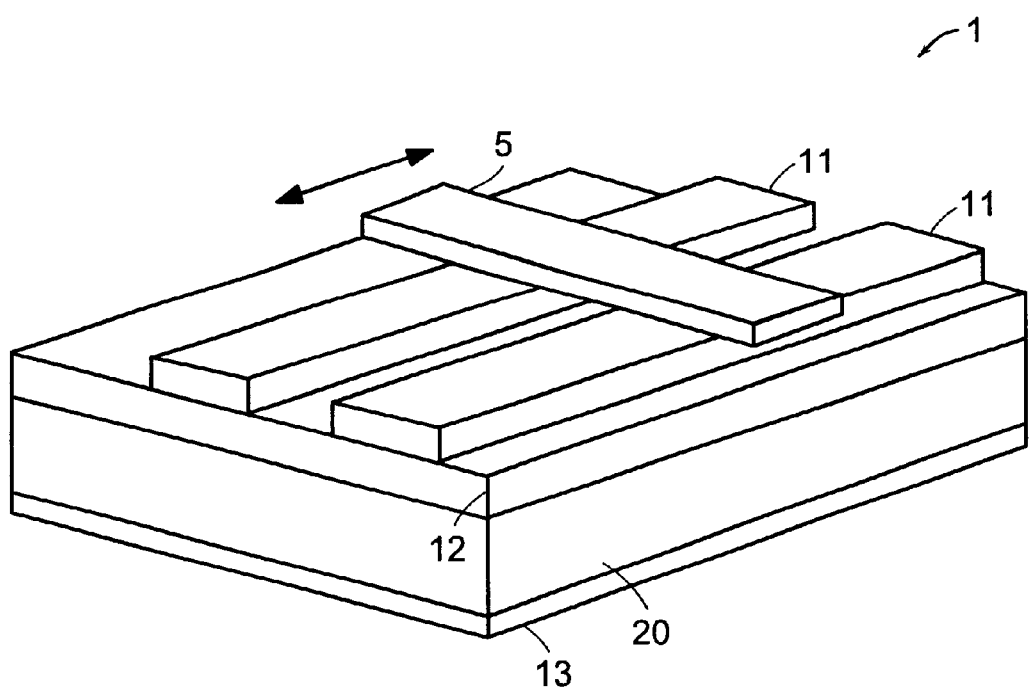
FIG. 1 is a perspective illustration of an embodiment of a photoconductively addressed display.

FIG. 1 is a perspective view of an embodiment of a photoconductively addressed display 1. The display 1 includes an imaging layer 20, a column electrode layer including a plurality of column electrodes 11 adjacent to one side of the imaging layer 20, and a plate electrode 13 adjacent to the other side of the imaging layer 20. A photoconductive layer 12 is disposed between the imaging layer 20 and the column electrode layer. A light source 5 illuminates an elongate portion of the photoconductive layer. In preferred embodiments, the imaging layer 20 includes an electro-optic display medium.

The conductivity of portions of the photoconductive layer 12 is manipulated via illumination to permit addressing, e.g., by a set of column electrodes 11. The photoconductive layer 12 is relatively non-conducting when not illuminated and conducting when illuminated. A portion of the photoconductive layer 12 may be illuminated by a light source 5 that may be translated (as indicated by the arrows) adjacent to the photoconductive layer to translate the location of the illuminated portion of the photoconductive layer 12. A particular pixel is addressed by coordinating the application of voltage to an electrode adjacent to, or part of, the pixel and application of illumination adjacent to the pixel.

In some embodiments, the light source 5 can be turned on and off, and/or can produce a continuous or discontinuous, e.g., segmented, band of light to create the illuminated elongate portion. By synchronizing the location of the illuminated elongate portion with application of a voltage to one or more of the column electrodes 11, individual elements or pixels can be addressed.

When an image pixel is addressed with a voltage, e.g. a voltage is applied to a column electrode 11, a corresponding voltage drop appears across portions of both the display medium and the photoconductive layer 12 that are adjacent to an electrode that carries the addressing voltage. A portion of the voltage drop appears across the photoconductive layer 12 while the remainder appears across the display medium, e.g., an electrophoretic display medium.

When the adjacent portion of the photoconductive layer 12 is not illuminated, the relatively high impedance of the photoconductive material allows the photoconductive layer 12 to support a substantial portion of the voltage drop. The remainder of the voltage drop may be insufficient to induce a change in the optical state of the electrophoretic display medium.

Illumination of photoconductive material generates charge carriers that can rearrange themselves to neutralize at least a portion of the electric field within the photoconductive material. Thus, a greater portion of the voltage drop appears across the electrophoretic display medium when an addressing voltage is applied to a pixel while an adjacent portion of the photoconductive layer 12 is illuminated. An electro-optic display medium of the addressed pixel may then respond to the addressing voltage by exhibiting an optical state change. For example, migration of electrophoretic particles within an electrophoretic display medium may lead to a change in the optical state.

The above-described layers are preferably disposed on a substrate, such as a glass, plastic, or polyester substrate. A substrate can be adjacent to the column electrodes 11. In some alternative embodiments, a substrate is adjacent to the plate electrode 13 to avoid undesirable optical effects arising from the substrate. A substrate can be provided with a conductive layer, for example, an indium tin oxide (ITO) layer, which can act as the plate electrode 13.

Figure 2:
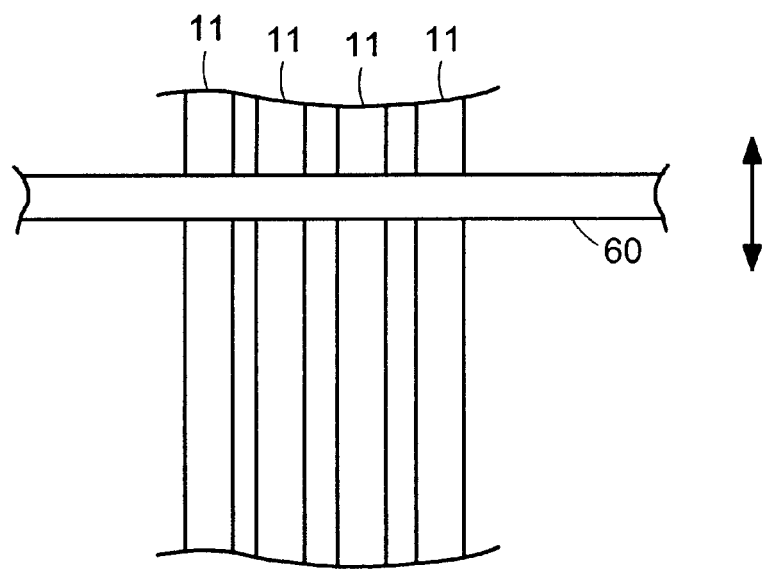
FIG. 2 is a planar view of a portion of a display corresponding to FIG. 1, in which light from an emitter defines an illuminated elongate portion of a photoconductive layer.

FIG. 2 is a planar view of a portion of a display corresponding to FIG. 1, which illustrates the behavior of an elongate illuminated portion 60 relative to the column electrodes 11. A light source determines the location of the illuminated elongate portion 60. A band of light emitted by a light source illuminates the photoconductive layer 12 to create the illuminated elongate portion 60.

The illuminated elongate portion 60 may be scanned in a direction parallel to the column electrodes 11. The scanning may be in one direction only, or in forward and backward directions. Rather than simple, linear scanning, the location of the illuminated elongate portion 60 may be translated in part through use of intermittent illumination. Hence, the illuminated elongate portion 60 may be translated in a non-linear fashion from location to location. Further, the band of light may be continuous or discontinuous, e.g., segmented. Hence, the illuminated elongate portion 60 may be continuous or discontinuous.

Figure 3:
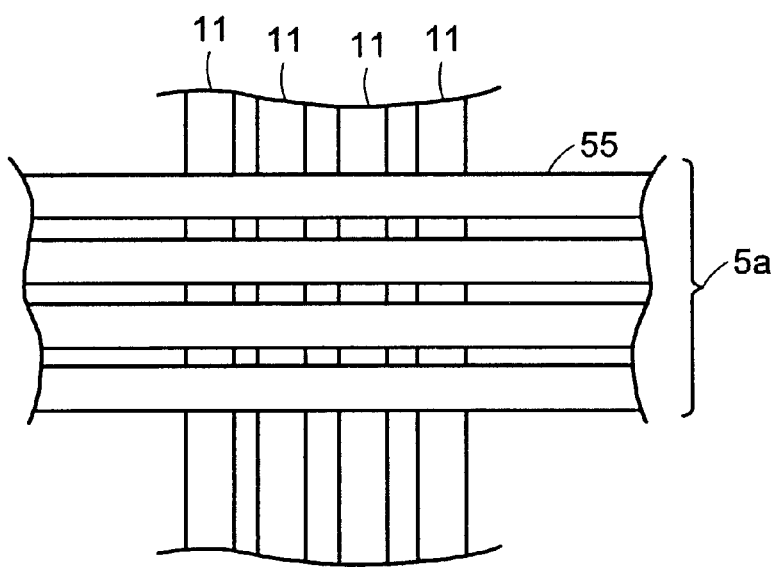
FIG. 3 is a planar view of an embodiment that includes a light source that scans light without translation of the light source.

FIG. 3 illustrates a planar perspective view of an embodiment that includes a light source 5a that scans light without translation of the light source 5a. The light source 5a includes a plurality of row emitters 55. Scanning, or translation, of the illuminated elongate portion 60 is accomplished by alternating illumination of one or more row emitters 55. The row emitters 55 may be turned on and off in any desired sequence to illuminate an adjacent portion of the photoconductive layer 12.

Each one of the plurality of row emitters 55 may be continuous or discontinuous. A row emitter 55 may emit a continuous or discontinuous band of light. The row emitters 55 may include, e.g., electroluminescent material. Materials for inclusion in row emitters 55, as well as other embodiments of a light source, are described further in a section below.

Figure 4:
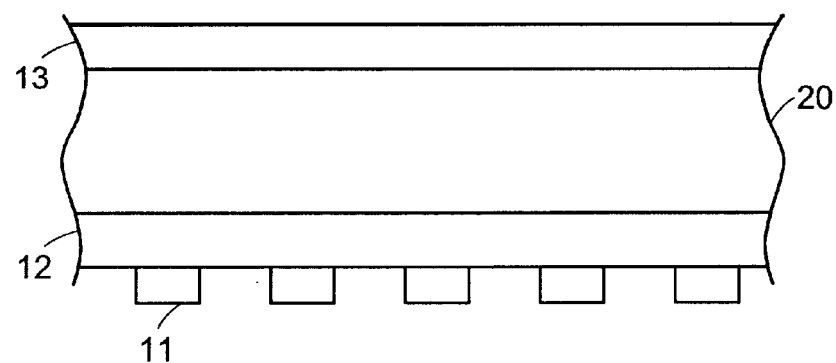
FIG. 4 is a cross-sectional view of an embodiment in which a photoconductive layer and a column electrode layer are adjacent to the same side of an imaging layer.
Figure 5:
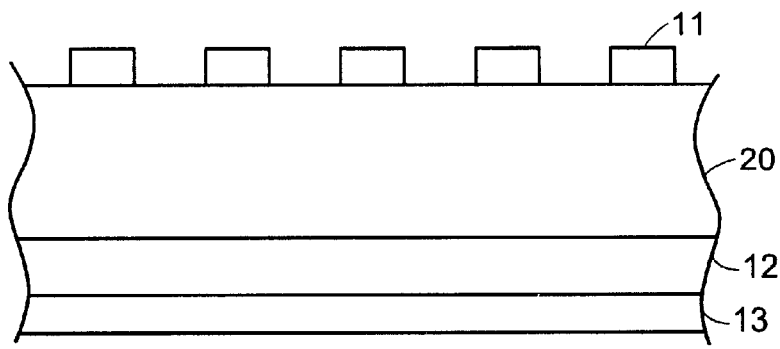
FIG. 5 is a cross-sectional view of an embodiment in which a photoconductive layer and a column electrode layer are adjacent to opposite sides of an imaging layer.
Figure 6:
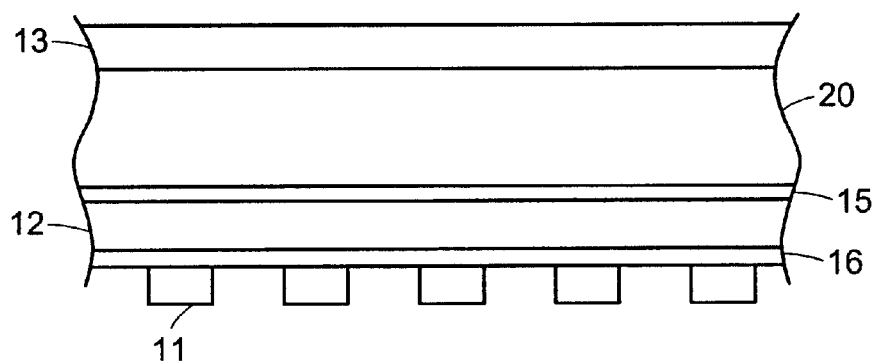
FIG. 6 is a cross-sectional view of an embodiment that includes an optical barrier layer and an electrical barrier layer.

FIGS. 4 through 6 are cross-sectional views that illustrate portions of various embodiments of a display. FIG. 4 shows an embodiment in which the photoconductive layer 12 and column electrode layer are adjacent to the same side of the imaging layer 20. FIG. 5 shows an embodiment in which the photoconductive layer 12 and the column electrode layer are adjacent to opposite sides of the imaging layer 20.

FIG. 6 illustrates an embodiment that includes an optical barrier layer 15 and an electrical barrier layer 16. The optical barrier layer 15 protects the photoconductive layer 12 from light leaking through the imaging layer 20. This can prevent an inadvertent, detrimental increase in the conductivity of the photoconductive layer 20.

The optical barrier layer 15 may be a dispersion of black pigment particles in an epoxy binder, for example. The optical barrier layer 15 generally must conduct any current which flows from the photoconductive layer 12 to the imaging layer 20. Accordingly, the conductivity of the optical barrier layer 15 must be high enough to permit this current flow, but low enough to limit lateral flow of current within the barrier layer, which can have an adverse effect on the resolution of the display. Thus, it is advantageous to make the optical barrier layer 15 as thin as possible.

The electrical barrier layer 16 may, for example, reduce the injection of charge into the photoconductive layer 12 when a voltage, but no illumination, is applied. When the photoconductive layer 12 is illuminated, photogenerated charges may pass easily between the photoconductive layer and the plate electrode.

Figure 7:
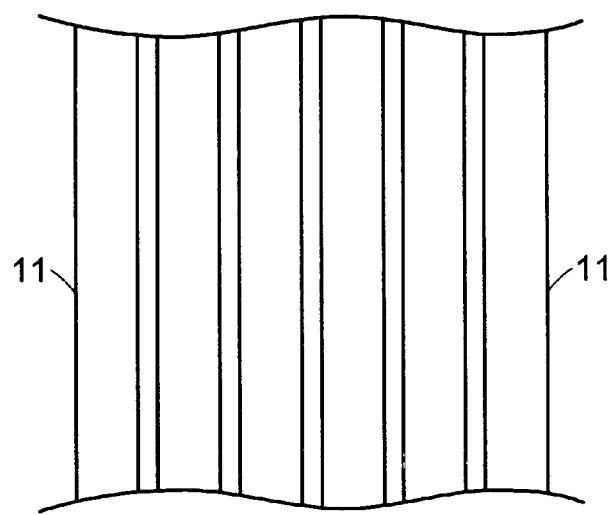
FIG. 7 is a planar view of an embodiment in which a column electrode layer includes a plurality of column electrodes that each extend in an X-direction and are spaced from each other in a Y-direction.
Figure 8A:
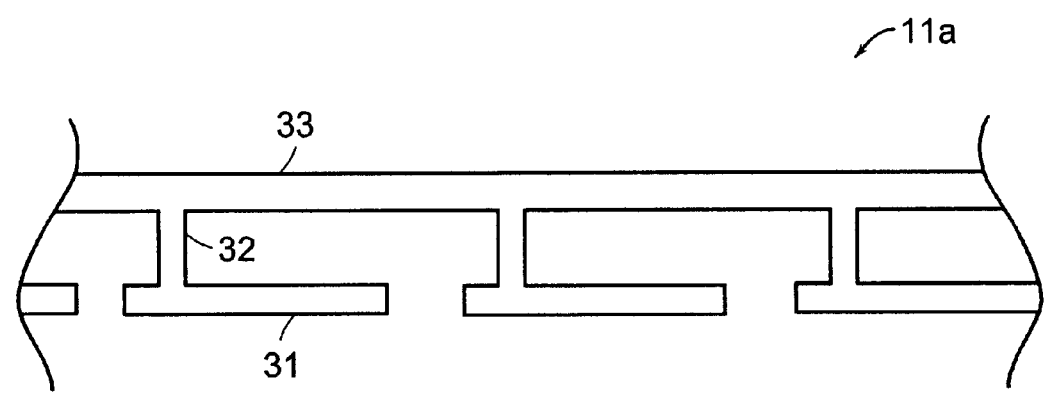
FIG. 8a is a planar view of an embodiment of a column electrode that includes an interconnect line and a plurality of pixel electrodes.
Figure 8B:
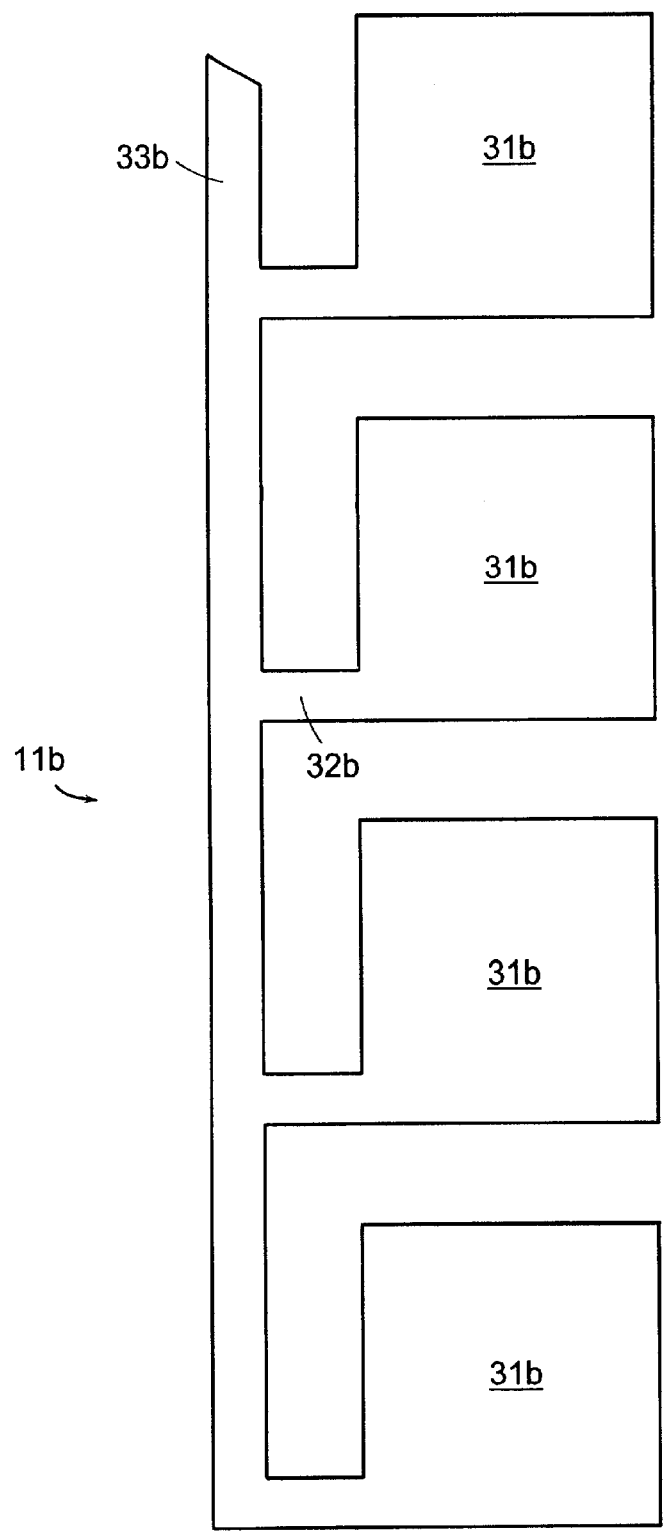
FIG. 8B is a cross-sectional view of an embodiment of a single column electrode.

FIGS. 7, 8a and 8b illustrate display embodiments, which have column electrodes of different configurations. The planar view of FIG. 7 illustrates a column electrode layer that includes a plurality of column electrodes 11 that each extend in an X-direction and are spaced from each other in a Y-direction. In this embodiment, a Y dimension of an image element is defined by a width of a column electrode 11 and an X dimension is defined by a width of the elongate illuminated portion. In other words, these widths determine a portion of the photoconductive layer that is both illuminated and subjected to a voltage drop. Other embodiments include column electrode having other shapes and spacings.

FIG. 8a illustrates a cross-sectional view of a single column electrode 11a. The column electrode 11a includes an interconnect line 33 and a plurality of pixel electrodes 31. The interconnect line 33 is at a different level than the level of the electrodes 31. Each pixel electrode 31 is electrically connected to the interconnect line 33 by way of a via 32. The area of the electrodes 31 (extending parallel to the viewing direction of FIG. 8a) preferably occupies a large fraction of the display area.

Referring to FIG. 8b, in other embodiments, the pixel electrodes lie in the same plane as the interconnect line. FIG. 8b illustrates a planar view of an embodiment of a single column electrode 11b. The column electrode 11b includes an interconnect line 33b and a plurality of pixel electrodes 31b that reside adjacent to and at the same level as the interconnect line 33b. Conductors 32b electrically connect the pixel electrodes 31b to the interconnect line 33b.

In some embodiments, a column electrode is formed by patterning a conductive film. In some embodiments, the shape, size and location of an image element is defined by each pixel electrode. The pixel electrode defines a portion of the photoconductive layer that can be subjected to a voltage drop.

In alternative embodiments, more than one elongate portion of the photoconductive layer is illuminated at any one time. Similarly, in some embodiments more than one row emitter emits light at any given time. In each case, addressing of individual pixels occurs at sites where illumination and a voltage addressed column electrode coincide.

Function of the Photoconductive Layer

The photoconductive layer preferably has a high impedance layer when not exposed to light. If a voltage is applied to an adjacent column electrode at this time, a voltage drop appears between the plate electrode and the column electrode. The voltage drop thus spans the photoconductive layer and the imaging layer. Because of its high impedance, most of the voltage drop appears across the photoconductive layer. Hence, the adjacent portion of the imaging layer is substantially unaffected by the application of a voltage.

When the display is illuminated, the impedance of the photoconductive layer decreases, and the majority of the applied voltage then drops across the electrophoretic layer, causing an optical response. The portions of the photoconductive layer that are exposed to light effectively transfer the voltage to the adjacent portions of the electrophoretic layer.

Function of the Imaging Layer

The imaging layer in preferred embodiments includes an electrophoretic medium. Preferably, the electrophoretic medium does not exhibit an optical change when a voltage is applied to a neighboring column electrode without coincident application of light to an adjacent portion of the photoconductive layer. In one embodiment, electrophoretic particles are held, for example, by an adhesive, cohesive or viscous force when a voltage drop is applied without coincidence of illumination. When illumination leads to a greater voltage drop across the electrophoretic medium, the particles can then overcome the inhibiting force or forces and cause an optical change.

In another embodiment, the imaging layer includes free ions that do not contribute to optical changes in the layer. The ions respond to a voltage drop by rearranging themselves to neutralize the electric field within the imaging layer. When the voltage drop across the imaging layer increases upon application of illumination to a neighboring portion of the photoconductive layer, the free ions are unable to completely neutralize the electric field. The imaging layer then responds to the voltage drop, producing an change in its optical state.

Optical Barrier Layer Materials

In some embodiments, an optical barrier layer also acts as an adhesion layer to attach the photoconductive layer to the imaging layer. For example, highly scattering pigments like titania or highly absorbing pigments like carbon black or absorbing dyes may be added to an adhesive material.

In some embodiments the optical barrier layer only passes certain wavelengths and/or polarizations of light. Some of these embodiments may be used in combination with a bright, spatially concentrated light source applied to the viewing surface of the display. Such a light source could be used to "write" on the display.

Electrical Barrier Layer Materials

In some embodiments, the electrical barrier layer may be formed by vapor deposition, sputtering, electrodeposition, anodization or solution coating. Materials may include, e.g., silicon or metal oxides. Various inorganic or organic materials may be solution coated. For example, a siloxane film may be coated from an aqueous solution of trialkoxy silane, such as trimethoxy or triethoxy aminopropyl silane or trimethoxy glycidyl silane.

Further, an aqueous or alcoholic solution or mixtures of two solvents may be used in formation of the barrier layer. Monoalkoxy and dialkoxy silanes may be used. Titanium oxides, such as tetraalkyl titanium oxides (titaniates) may be coated from an aqueous solution.

Other useful materials include polymers, e.g., polyvinyl butryals, polyesters, polyhydric polymers, or epoxies. Dual polymer layers may include a layer of an acidic polymer, such as a polyacrylic acid, and a basic polymer such as polyvinyl pyrridine. The region between two such polymers typically contain acid-base interactions, which may serve to block thermally activated carriers.

Photoconductive Layer Materials

In some embodiments, the thickness of the photoconductive layer is between approximately 0.05 micrometers and approximately 25.0 micrometers.

Photoconductive materials for use in displays of the invention include inorganic materials, organic photoconductive polymers, dye-aggregate photoreceptors, and photoconductive pigments. In some embodiments of the invention, it may be advantageous to construct a two-layer photoconductive material in which the charge-generation and charge-transport layers are separate (i.e., a dual-layer configuration). Photoconductive materials for use in displays of the invention may be organic photoconductive polymers. An example of an organic photoconductive polymer is 2,4,7-trinitro-9-fluorenone complexed with poly(N-vinylcarbazole). In pigment-based photoconductors, the pigment particles themselves are photoconductive, and are dispersed in a polymer; this polymer may itself be photoconductive, or simply inert.

Useful materials include layered photoconductive materials having inorganic or organic compositions, and composite layered materials containing photoconductive materials in a polymer matrix. One example of a composite layered material is a dispersion of zinc oxide particles in a polymer matrix. Useful polymer matrices include those which are capable of transporting for a significant distance injected charge carriers generated by the photoconductive material. Such useful polymer matrices include, but are not limited to, polystyrene resins, silicone resins, acrylic and methacrylic ester polymers, polymerized ester derivatives of acrylic and $\alpha$-acrylic acids, chlorinated rubber, vinyl polymers and copolymers, cellulose esters and epoxy resins.

Other known photoconductive materials include amorphous selenium, halogen doped amorphous selenium substances, amorphous selenium alloys, including selenium arsenic, selenium tellurium, selenium arsenic antimony, halogen doped selenium alloys, wherein the halogen is a material such as chlorine, iodine, or fluorine, cadmium sulfide, and the like. Generally, these photoconductive materials are deposited on a suitable clear substrate, such as a glass, plastic, or polyester substrate.

In some embodiments, finely divided particles of a photoconductive inorganic or organic compound are dispersed in an electrically insulating organic resin binder. Photoconductive particles may include, for example, trigonal selenium, metal-free phthalocyanine, copper phthalocyanine, vanadyl phthalocyanine, hydroxy gallium phthalocyanine, titanyl phthalocyanine, quinacridones, 2,4-diamino-triazines, squaraines, perylenes, bis- and tris-azo pigments, and polynuclear aromatic quinines.

Some organic resinous binders include, e.g., polycarbonates, acrylate polymers, vinyl polymers, cellulose polymers, polyesters, polysiloxanes, polyamides, polyurethanes, and epoxies, as well as copolymers.

Depending on their construction, photoconductive materials may be tuned in sensitivity to different portions of the infrared, visible, and ultraviolet spectrum. A photoconductive material for use in a display of the invention preferably has an absorption activity that is substantially matched to the emissive wavelength range of the particular organic, light-emitting material being used in that display. The wavelength sensitivity of the photoconductor is dependent on the composition of the charge generator. For example, if the charge generator primarily includes selenium alloys, the photoconductive material is most sensitive to blue light near the 400 nm wavelength range. Alternatively, if the charge generator mainly includes phthalocyanine pigments, the photoconductive material is most sensitive to red light near the 700 nm wavelength range.

Illumination Sources

Figure 9:
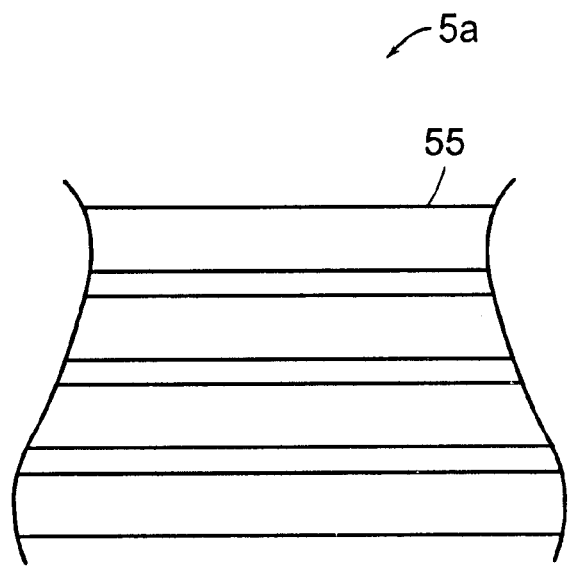
FIG. 9 is a planar view of an embodiment, similar to that of FIG. 3, in which a light source has a light-emitting layer that includes a plurality of continuous row emitters.
Figure 10:
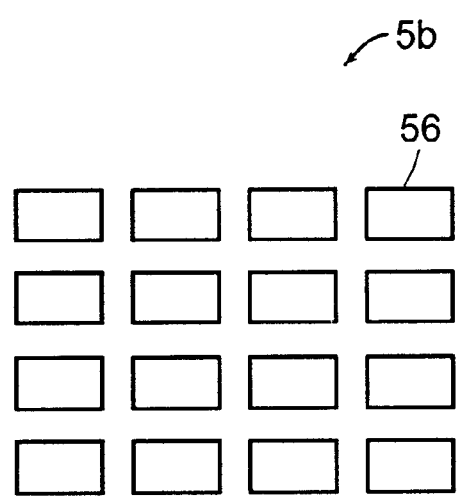
FIG. 10 is a planar view of an embodiment in which a light source has a light emitting layer that includes a two-dimensional array of light emitters.

Referring to FIG. 9 and FIG. 10, a light source can include a light-emitting layer. FIG. 9 illustrates an embodiment, similar to that in FIG. 3, in which a light source 5a includes a light-emitting layer. The light emitting layer includes a plurality of continuous row emitters 55.

FIG. 10 illustrates an embodiment in which a light source 5b has a light emitting layer that includes a two-dimensional array of light emitters 56. The light emitters have a rectangular shape and are slightly spaced from one another. In other embodiments, the light emitters 56 have other shapes, e.g., circular or polygonal, or are differently spaced, e.g., contiguous to one another. The light emitters 56 may include, e.g., light emitting diodes (LED) or electroluminescent material.

In some embodiments, the light-emitting layer includes an organic material, such as an organic compound, an organometallic compound, an oligomer, or a polymer, for example. Light-emitting layers for use in displays of the invention are preferably an organic, light-emitting material (i.e., an organic, light-emitting diode, or OLED) disposed on a clear substrate. The substrate may be a glass, plastic, or polyester substrate. Organic, light-emitting materials, or OLEDs, for use in displays of the invention include organic compounds, organometallic compounds, oligomers, and polymers.

Examples of organic materials that may be useful in the invention include, but are not limited to, tris-(8-hydroxyquinoline) aluminum ($Alq_3$), N,N'-bis-(1-naphyl)-N,N'-diphenyl-1,1'-biphenyl-4,4'-diamine (NPB), poly[2,5-bis[2-(N,N,N-triethylammonium)ethoxy]-1,4-phenylene-alt-1,4-phenylene]dibromide ($PPP-NEt_3^+)^5$, and poly(5-methoxy-(2-propanoxysulfonide)-1,4-phenylene vinylene) (MPS-PPV).

In one embodiment, the organic, light-emitting layer is a multi-layer composition. For example, the organic, light-emitting layer may be a composition of ITO/copper phthalocyanine/NPB/8-hydroxyquinoline aluminum/Mg. Additionally, composites of such organic materials may be used as the organic, light-emitting layer, such as MPS-PPV doped $PPP-NEt_3^+$, for example.

Other organic, light-emitting materials that may be useful in the invention are not formally diodes. Such materials work by the formation of dynamic p-n junctions or by other processes, such as chemiluminescence, for example. The light-emitting materials described herein include these and related materials.

Organic, light-emitting materials for use in the invention may also include dispersions or layers of inorganic semiconductors. Such inorganic semiconductors include, but are not limited to, CdSe. The devices may have multiple layers, including electron-injecting electrodes, electron transport layers, emissive layers, hole transporting layers, and hole-injecting electrodes.

One drawback of organic, light-emitting materials is their relatively short lifetimes, particularly when operated to produce light. In particular, the organic, light-emitting material tends to degrade unless water and oxygen are excluded. For this reason, the organic light-emitting material may be protected from exposure to water and oxygen by a barrier layer disposed over the organic, light-emitting material.

In addition to organic, light-emitting materials, other light-emitting materials may be useful in the invention. Suitable light-emitting materials include, but are not limited to, transmissive materials, lasers, slide projectors, inorganic, light-emitting diodes, cathode ray tubes, and incandescent, fluorescent, infrared, or neon bulbs. Similarly, the light-emitting layer may be a microwave, radio frequency, or X-ray device, or any other device or material that creates, either directly or through suitable means, sufficient wavelength energy to cause an electrical response by an appropriately sensitive mediator. The light-emitting material may also be an electroluminescent material, such as ZnS dispersed in a polymer matrix, for example.

Referring to FIGS. 11 through 16 are cross-sectional views of various embodiments, which include light sources that illuminate the photoconductive layer without use of the above-described light emitting layer. For example, in these embodiments, the light source may be disposed at some distance from the photoconductive layer and adjacent films, or may be translated along the photoconductive layer.

Figure 11:
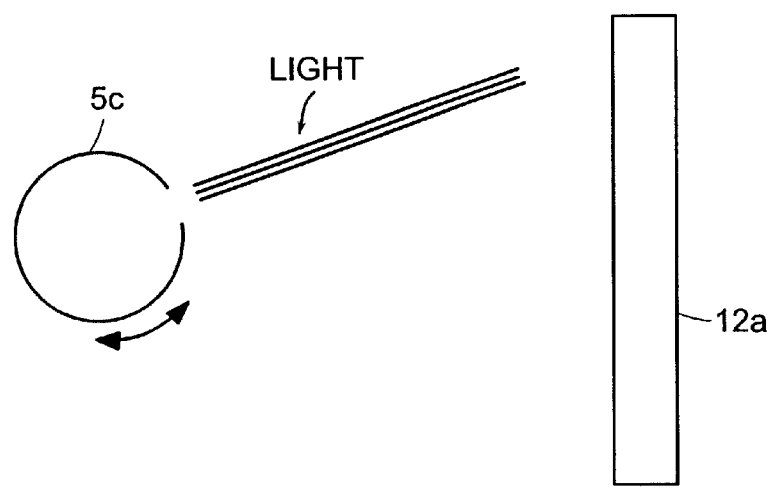
FIG. 11 is a planar view of an embodiment having a light source that is spaced from a photoconductive layer, and rotates to scan light over portions of the photoconductive layer.

The embodiment illustrated in FIG. 11 includes a light source 5c that is spaced from a photoconductive layer 12a. The light source 5c rotates to scan light over portions of the photoconductive layer 12a.

Figure 12:
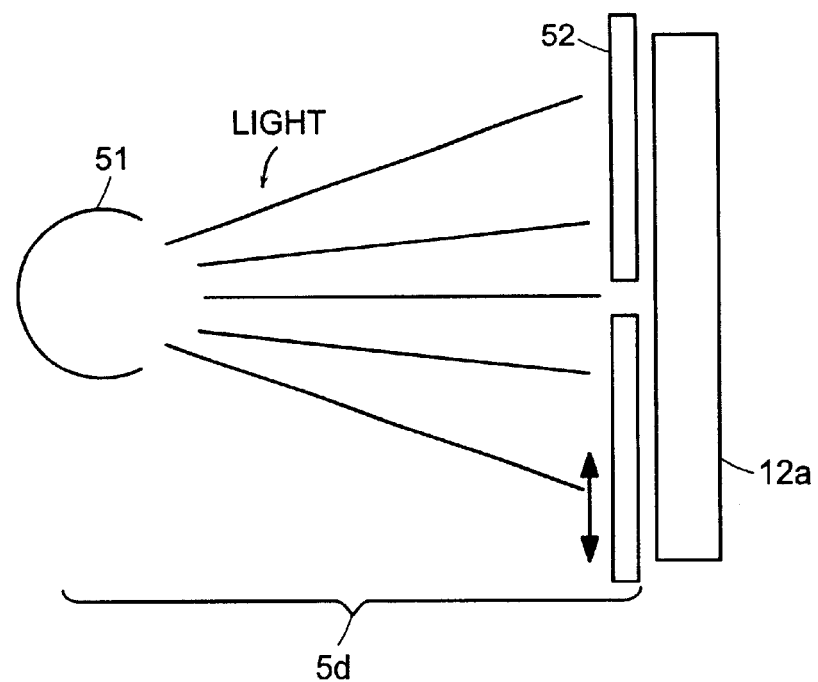
FIG. 12 is a planar view of an embodiment having an emitter that directs a broad beam of light towards a photoconductive layer and a shutter that translates adjacent to the photoconductive layer.

In the embodiment illustrated by FIG. 12, a light emitter 51 directs a broad beam of light towards the entire photoconductive layer 12a. A shutter 52 translates adjacent to the photoconductive layer 12a to provide illumination to a portion of the photoconductive layer 12a.

Figure 13:
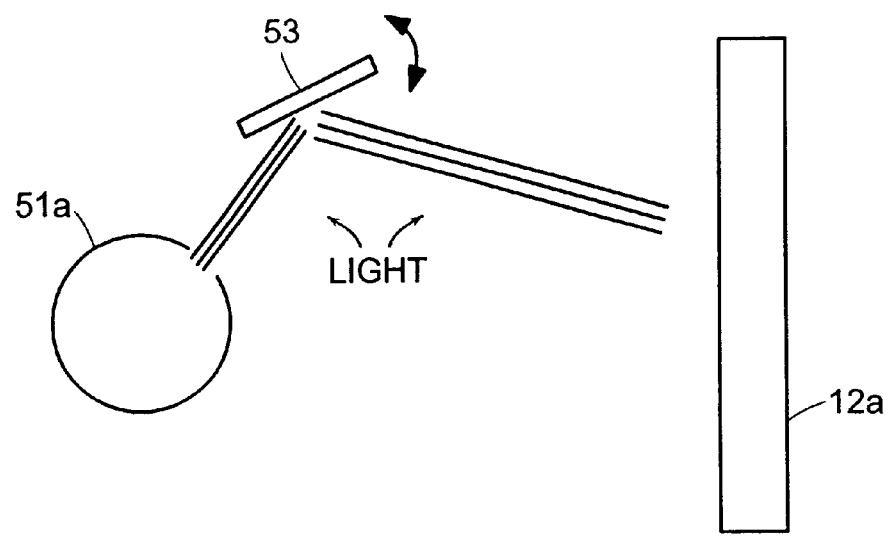
FIG. 13 is a planar view of an embodiment having a light emitter that directs illumination at a mirror, and the mirror directs the light at a photoconductive layer.

In the embodiment shown in FIG. 13, a light emitter 51a directs illumination at a mirror 53, which directs the light at the photoconductive layer 12a. The illuminated portion of the photoconductive layer 12a is translated by rotation of the mirror 53.

Figure 14:
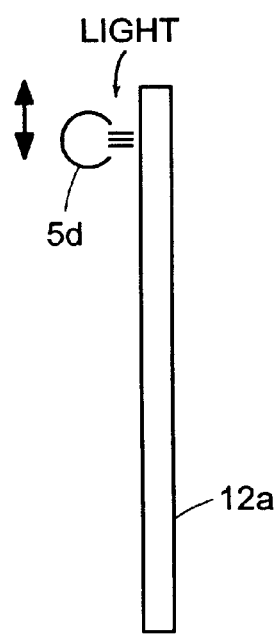
FIG. 14 is a planar view of an embodiment having a light emitter that is translated adjacent to a photoconductive layer to enable scanning of an illuminated elongate portion.
Figure 15:
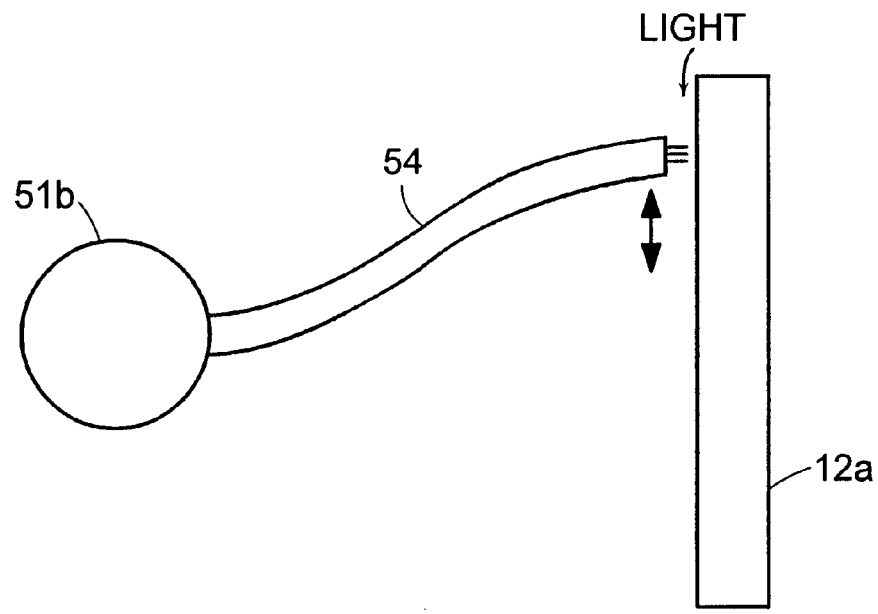
FIG. 15 is a planar view of an embodiment that includes fiber optic components that transmit light from a light emitter to a photoconductive layer.

In the embodiment shown in FIG. 14, a light emitter 5d is translated along the surface to enable scanning of an illuminated elongate portion. In various embodiments, a light emitter is intermittently turned on and off to assist in addressing of image elements.

Various embodiments utilize fiber optics in a light source. In the embodiment illustrated in FIG. 15, light is transmitted from a light emitter 51b via a fiber bundle 54 to a photoconductive layer 12a. One end of the bundle 52 is translated adjacent to the photoconductive layer 12a to scan the location of illumination. The bundle 54 includes a cross section of varying width and shape. For example, a cross section near a midpoint of the bundle 54 may be circular while a cross section near the end that translates may be rectangular, or other shape, to define a shape of the illuminated portion of the photoconductive layer 12a. The bundle 54 may also include sections of light pipe material, e.g., to help mate fiber portions of the bundle 54.

Figure 16:
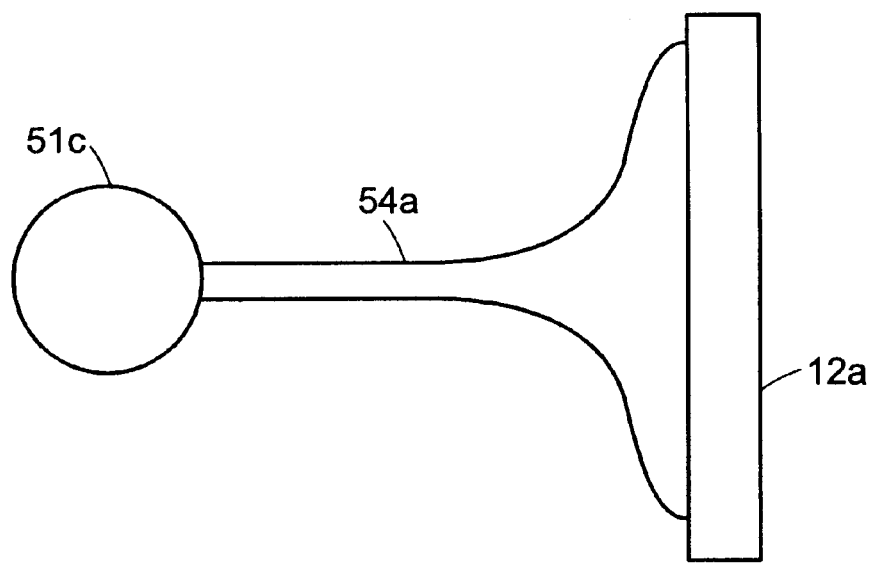
FIG. 16 is a planar view of an embodiment that includes fiber optic components that transmit light from a light emitter to a photoconductive layer.

The embodiment illustrated by FIG. 16 employs a fiber bundle 54a with no moving parts. The fiber bundle 54a has a broader portion adjacent to the photoconductive layer 12a, to deliver light to a desired portion of the photoconductive layer 12a without movement of the bundle 54a adjacent to the photoconductive layer 12a. A light emitter 51c scans light across an opposite end of the bundle 54a to deliver light to the desired location.

Figure 17:
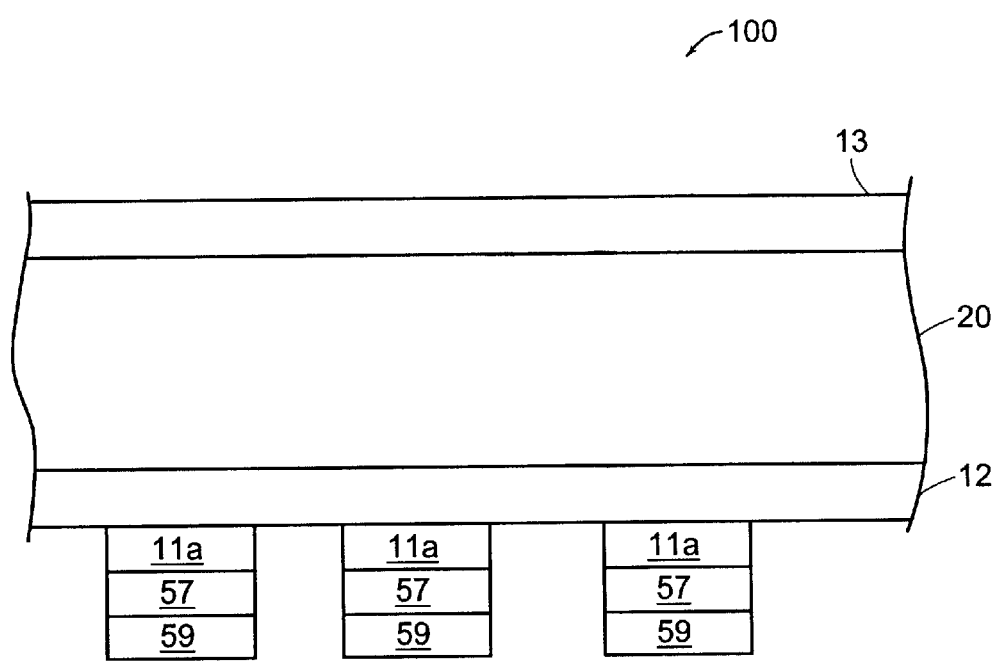
FIG. 17 is a planar view of an embodiment of a display that includes electrodes that are shared by a light source and by a column electrode layer.

FIG. 17 illustrates an embodiment of a display that utilizes electrodes that are shared by a light source and by a column electrode layer. The display 100 includes light emitting elements 57 that are illuminated by applying a voltage to a shared electrode 11a and a light source electrode 59. The column electrode layer includes and shares the shared electrodes 11a. The shared electrodes 11a and the light source electrodes 59 may be continuous or segmented.

Drive Electronics

Various embodiments of the invention have many benefits over traditional displays. For example, a light-emitting layer and an electrophoretic layer are opto-isolated, making the display more tolerant of surges and spikes in the drive electronics than would be true if the drive electronics were connected directly. Furthermore, when the display is bistable, the display need only operate during the switching period and is otherwise deactivated. During the switching period, even a small amount of light is sufficient to activate certain photoconductors. Thus, the display operates with reduced power consumption and improved lifetime compared to a standalone emissive display.

Imaging Layer Materials

In some preferred embodiments, a display has an imaging layer that includes an encapsulated electrophoretic medium. An encapsulated electrophoretic medium typically does not suffer from the clustering and settling failure mode of traditional electrophoretic devices. Further advantages include, e.g., the ability to print or coat the medium on a wide variety of flexible and rigid substrates.

Use of the word "printing" is here intended to include all forms of printing and coating, including, but without limitation: premetered coating, such as patch die coating; slot or extrusion coating; slide or cascade coating; curtain coating; roll coating, such as knife over roll coating or forward and reverse roll coating; gravure coating; dip coating; spray coating; meniscus coating; spin coating; brush coating; air knife coating; silk screen printing processes; electrostatic printing processes; thermal printing processes; and other similar techniques. Thus, the resulting display can be flexible and in expensive, possibly by use of printing of other materials.

Such displays, therefore, can be incorporated into a variety of applications. The display can be formed from and can include particles that move in response to an electric charge. This mode of operation is typical in the field of electrophoretic displays. A display in which the particles, ordered by an electric charge, take on a certain configuration can take on many forms. Once the electric field is removed, the particles can be generally stable (e.g., bistable). Additionally, providing a subsequent electric charge can alter a prior configuration of particles.

Some encapsulated electrophoretic displays may include two or more different types of particles. Such displays may include, for example, displays containing a plurality of anisotropic particles and a plurality of second particles in a suspending fluid. Application of a first electric field may cause the anisotropic particles to assume a specific orientation and present an optical property. Application of a second electric field may then cause the plurality of second particles to translate, thereby disorienting the anisotropic particles and disturbing the optical property. Alternatively, the orientation of the anisotropic particles may allow easier translation of the plurality of second particles. The particles may have a refractive index that substantially matches the refractive index of the suspending fluid.

An encapsulated electrophoretic display can be constructed so that the optical state of the display is stable for some length of time. When the display has two states that are stable in this manner, the display is bistable. If more than two states of the display are stable, then the display is multistable. For the purpose of the present invention, the term bistable indicates a display in which any optical state remains fixed once the addressing voltage is removed. However, the definition of a bistable state depends upon the display's application. A slowly decaying optical state can be effectively bistable if the optical state is substantially unchanged over the required viewing time. For example, in a display that is updated every few minutes, a display image that is stable for hours or days is effectively bistable for a particular application.

Thus, for purposes of the present invention, the term bistable also indicates a display with an optical state sufficiently long-lived so as to be effectively bistable for a particular application. Alternatively, it is possible to construct encapsulated electrophoretic displays in which the image decays quickly once the addressing voltage to the display is removed (i.e., the display is not bistable or multistable). Whether or not an encapsulated electrophoretic display is bistable, and its degree of bistability, can be controlled through appropriate chemical modification of the electrophoretic particles, the suspending fluid, the capsule, and binder materials.

An encapsulated electrophoretic display may take many forms. The display may include capsules dispersed in a binder. The capsules may be of any size or shape. The capsules may, for example, be spherical and may have diameters in the millimeter range or the micron range, but are preferably from about ten to about a few hundred microns. The capsules may be formed by an encapsulation technique. Particles may be encapsulated in the capsules. The particles may be two or more different types of particles. The particles may be colored, luminescent, light-absorbing or transparent, for example. The particles may include neat pigments, dyed (laked) pigments or pigment/polymer composites, for example. The display may further include a suspending fluid in which the particles are dispersed.

Generally, an encapsulated electrophoretic display includes a capsule with one or more species of particle that either absorb or scatter light and that are suspended in a fluid. One example is a system in which the capsules contain one or more species of electrophoretically mobile particles dispersed in a dyed suspending fluid. Another example is a system in which the capsules contain two separate species of particles suspended in a clear suspending fluid, in which one species of particle absorbs light (black), while the other species of particle scatters light (white). There are other extensions (more than two species of particles, with or without a dye, etc.). The particles are commonly solid pigments, dyed particles, or pigment/polymer composites.

In electrophoretic displays, the particles may be oriented or translated by placing an electric field across the capsule. The electric field may include an alternating-current field or a direct-current field. The electric field may be provided by at least one pair of electrodes disposed adjacent to a display comprising the capsule.

The successful construction of an encapsulated electrophoretic display requires the proper interaction of all these materials and processes. Materials such as a polymeric binder (for example, for binding the capsules to a substrate), electrophoretic particles, fluid (for example, to surround the electrophoretic particles and provide a medium for migration), and a capsule membrane (for example, for enclosing the electrophoretic particles and fluid) must all be chemically compatible. The capsule membranes may engage in useful surface interactions with the electrophoretic particles, or may act as an inert physical boundary between the fluid and the binder. Polymer binders may set as adhesives between capsule membranes and electrode surfaces.

Various materials may be used to create electrophoretic displays. Selection of these materials is based on the functional constituents of the display to be manufactured. Such functional constituents include, but are not limited to, particles, dyes, suspending fluids, stabilizing/charging additives, and binders. In one embodiment, types of particles that may be used to fabricate suspended particle displays include scattering pigments, absorbing pigments and luminescent particles. Such particles may also be transparent.

Exemplary particles include titania, which may be coated in one or two layers with a metal oxide, such as aluminum oxide or silicon oxide, for example. Such particles may be constructed as corner cubes. Luminescent particles may include, for example, zinc sulfide particles. The zinc sulfide particles may also be encapsulated with an insulative coating to reduce electrical conduction. Light-blocking or absorbing particles may include, for example, dyes or pigments.

Types of dyes for use in electrophoretic displays are commonly known in the art. Useful dyes are typically soluble in the suspending fluid, and may further be part of a polymeric chain. Dyes may be polymerized by thermal, photochemical, and chemical diffusion processes. Single dyes or mixtures of dyes may also be used.

A suspending (i.e., electrophoretic) fluid may be a high resistivity fluid. The suspending fluid may be a single fluid, or it may be a mixture of two or more fluids. The suspending fluid, whether a single fluid or a mixture of fluids, may have its density substantially matched to that of the particles within the capsule. The suspending fluid may be halogenated hydrocarbon, such as tetrachloroethylene, for example. The halogenated hydrocarbon may also be a low molecular weight polymer. One such low molecular weight polymer is poly(chlorotrifluoroethylene). The degree of polymerization for this polymer may be from about 2 to about 10.

Furthermore, capsules may be formed in, or later dispersed in, a binder. Materials for use as binders include water-soluble polymers, water-dispersed polymers, oil-soluble polymers, thermoset polymers, thermoplastic polymers, and uv- or radiation-cured polymers.

While the examples described here are listed using encapsulated electrophoretic displays, there are other particle-based display media that also should work well, including encapsulated suspended particles and rotating ball displays. Other display media, such as liquid crystals and magnetic particles, also can be useful.

In some cases, a separate encapsulation step of the process is not necessary. The electrophoretic fluid may be directly dispersed or emulsified into the binder (or a precursor to the binder material) to form what may be called a "polymer-dispersed electrophoretic display." In such displays, the individual electrophoretic phases may be referred to as capsules or microcapsules even though no capsule membrane is present. Such polymer-dispersed electrophoretic displays are considered to be subsets of encapsulated electrophoretic displays.

In an encapsulated electrophoretic display, the binder material surrounds the capsules and separates the two bounding electrodes. This binder material must be compatible with the capsule and bounding electrodes and must possess properties that allow for facile printing or coating. It may also possess barrier properties for water, oxygen, ultraviolet light, the electrophoretic fluid, or other materials, Further, it may contain surfactants and cross-linking agents, which could aid in coating or durability. The polymer-dispersed electrophoretic display may be of the emulsion or phase separation type.

Though electrophoretic layers for use in displays of the invention are preferably encapsulated electrophoretic layers, other electrophoretic layers are contemplated by the invention. Such layers include dielectrophoretic layers, addressable retroreflective layers, and micro-mechanical, micro-mirror, or other light-directing layers, as well as layers in which the optical effect is achieved by translating various liquids of differing dielectric constants (i.e., suspended liquid displays).

The electrophoretic layer may also be a classic emissive, transmissive, or transflective display material. Furthermore, the electrophoretic layer may be nematic liquid crystals in a variety of modes (e.g., tunable birefringence, twisted nematic, or vertically-aligned nematic), polymer dispersed liquid crystals, ferroelectric liquid crystals, or standard electrophoretic displays on glass. (See, e.g., "High Resolution Display with Photoconductor Addressing" by Stephen Blazo, *SID Digest Technical Papers* 1982, pp. 92–93). Such displays, while effective, are, however, typically expensive to produce and/or are limited to use in small areas.

Plate Electrode Materials

The plate electrode, i.e. conductive layer, can include, e.g., a metal, such as titanium, tantalum, nickel, aluminum, copper, niobium, chromium, iron, silver, gold, or their alloys. The thickness of the plate electrode is preferably thin enough to transmit an effective amount of light. Generally, an effective amount of light is 20%, preferably more than 50%, more preferably more than 90%. The thickness depends on the wavelength of the incident light, longer wavelengths requiring thinner films.

The plate electrode can include a conductive oxide like tin oxide, indium oxide, or their alloys. Alternatively the electrode can include an inorganic salt, e.g., copper iodide or any oxide or salt dispersed in a polymer matrix at sufficiently high concentrations to attain adequate conductivity. The plate electrode can include an organic conductor or an organic dispersed in a polymer matrix.

Generally, the conductivity is adequate when the time constant of the charging of the conductive layer is shorter than the image formation time. Adequate conductivity generally entails a resistivity of less than $10^4$ ohms/square, preferably less than $10^3$ ohms/square, and more preferably less than 100 ohms/square. If the there is danger of fragility due to the thinness of the conductive layer, the conducting material may be coated on a support layer, e.g., glass or plastic. One acceptable plastic is a biaxially oriented polyester, e.g., MYLAR available from E. I. du Pont de Nemours & Company, Wilmington, Del., ESTAR from Eastman Kodak Company, Rochester, N.Y., or MELINEX from ICI Americas, Inc., Wilmington, Del.

Grayscale Images

Some embodiments include pixels that have a varying number of sub-pixel regions and different photoconductive materials in order to provide grayscale or color displays. For example, a pixel is split into four sub-pixels with each sub-pixel having a photoconductive material sensitive to, for example, varying levels or durations of light. A single underlying light-emitting layer actuates one, two, three, or four of the sub-pixel regions, and thereby achieves four-bit grayscale. In this manner, a grayscale emissive display drives a grayscale electrophoretic display. Similarly, in another example, the various sub-pixel regions correspond to varying colors. In this manner, a grayscale emissive display drives an electrophoretic layer capable of different colors without requiring separate addressing for each of the color sub-pixel regions.

In another embodiment, photoconductive layer sub-regions are tuned to respond to varying frequencies of light. A single pixel is therefore capable of generating multiple frequencies of light, which actuate multiple individual overlying pixels or sub-pixels. This permits an emissive display of one resolution to successfully address a second display at a higher resolution.

Grayscale can also be controlled by varying the time that a particular pixel is exposed to illumination and/or by varying the intensity of the illumination.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A photoconductively addressed display comprising:
   an electro-optic imaging layer that extends in an X direction and a Y direction, and comprises an array of image elements;
   a column electrode layer adjacent to one side of the electro-optic imaging layer and comprising a plurality of column electrodes that each extend in the Y direction and are spaced from one another in the X direction;
   a photoconductive layer disposed between the electro-optic imaging layer and the column electrode layer;
   a light source that illuminates an elongate portion of the photoconductive layer in the X direction while scanning emitted light in the Y direction to translate a location of the illuminated elongate portion; and
   a voltage source that addresses at least one image element by applying an intermittent voltage to one of the plurality of column electrodes that is adjacent to the at least one image element while the illuminated elongate portion of the photoconductive layer is adjacent to the at least one image element.

2. The display of claim 1 wherein the X direction and the Y direction are orthogonal.

3. The display of claim 1 wherein the photoconductive layer is patterned.

4. The display of claim 1 wherein each column electrode comprises a plurality of pixel electrodes and an interconnect line in electrical communication with each one of the plurality of pixel electrodes.

5. The display of claim 4 wherein each pixel electrode comprises a contact pad that defines a size and position of an adjacent corresponding image element.

6. The display of claim 1 wherein each column electrode defines an X width of an adjacent image element, and a Y width of the elongate portion of the photoconductive layer defines a Y width of the adjacent image element.

7. The display of claim 1 wherein the light source comprises a mirror that scans the emitted light.

8. The display of claim 1 wherein at least a portion of the light source moves in the Y direction to scan the emitted light.

9. The display of claim 1 wherein the light source comprises an array of light emitters.

10. The display of claim 9 wherein at least one of the light emitters comprises a light emitting diode.

11. The display of claim 9 wherein the array is a two-dimensional array.

12. The display of claim 11 wherein portions of the array sequentially emit light to scan the emitted light in the Y direction.

13. The display of claim 1 wherein the light source intermittently illuminates the elongate portion.

14. The display of claim 1 wherein the light source comprises a cathode-ray tube.

15. The display of claim 1 wherein the light source emits light that is spatially discontinuous in the X direction.

16. The display of claim 1 wherein the emitted light is scanned in both negative and positive Y directions.

17. The display of claim 1 further including at least one optical fiber to conduct light from the light source to the photoconductive layer.

18. The display of claim 1 further including an optical barrier layer disposed between the electro-optic imaging layer and the photoconductive layer.

19. The display of claim 1 further including an electrical barrier layer disposed between the photoconductive layer and the column electrode layer.

20. A method of photoconductive addressing in a display, the method comprising:
    providing an electro-optic imaging layer that extends in an X direction and a Y direction, and comprises an array of image elements;
    providing a column electrode layer adjacent to one side of the electro-optic imaging layer and comprising a plurality of column electrodes that each extend in the Y direction and are spaced from one another in the X direction;
    providing a photoconductive layer disposed between the electro-optic imaging layer and the column electrode layer;
    illuminating an elongate portion of the photoconductive layer in the X direction while scanning illumination in the Y direction to translate a location of the illuminated elongate portion; and
    addressing at least one image element by applying an intermittent voltage to one of the plurality of column electrodes that is adjacent to the at least one image element while the illuminated elongate portion of the photoconductive layer is adjacent to the at least one image element.

21. The method of claim 20 wherein the plurality of pixel electrodes are contiguous portions of an interconnect line, and a pixel electrode width is defined by the width of the interconnect line and a pixel electrode height is defined by a width of the illuminated portion.

22. The method of claim 20 wherein each pixel electrode comprises a contact pad that defines a size and position of the adjacent corresponding image element, and each one of the plurality of column electrodes further comprises an interconnect line electrically connecting the plurality of pixel electrodes.

23. The method of claim 20 wherein the step of illuminating an elongate portion of the photoconductive layer comprises intermittently illuminating the elongate portion of the photoconductive layer.

* * * * *

UNITED STATES PATENT AND TRADEMARK OFFICE
CERTIFICATE OF CORRECTION

PATENT NO. : 6,900,851 B2
DATED : May 31, 2005
INVENTOR(S) : Morrison et al.

It is certified that error appears in the above-identified patent and that said Letters Patent is hereby corrected as shown below:

Title page,
Item [*] Notice, delete the paragraph reading "This patent is subject to a terminal disclaimer."

Signed and Sealed this

Sixth Day of September, 2005

JON W. DUDAS
*Director of the United States Patent and Trademark Office*